US010502362B2

(12) United States Patent
Shin

(10) Patent No.: US 10,502,362 B2
(45) Date of Patent: Dec. 10, 2019

(54) LIFTING APPARATUS FOR HIGHLY MOUNTED EQUIPMENT

(71) Applicant: REEL TECH CO., LTD, Suncheon-si (KR)

(72) Inventor: Jeong Hoon Shin, Suncheon-si (KR)

(73) Assignee: REEL TECH CO., LTD, Suncheon-si (KR)

( * ) Notice: Subject to any disclaimer, the term of this patent is extended or adjusted under 35 U.S.C. 154(b) by 809 days.

(21) Appl. No.: 15/202,923

(22) Filed: Jul. 6, 2016

(65) Prior Publication Data

US 2017/0009937 A1    Jan. 12, 2017

(30) Foreign Application Priority Data

Jul. 6, 2015    (KR) ........................ 10-2015-0096132
Mar. 25, 2016    (KR) ........................ 10-2016-0036094

(51) Int. Cl.
*F21V 21/38* (2006.01)
*F16M 13/02* (2006.01)
(Continued)

(52) U.S. Cl.
CPC ............. *F16M 13/027* (2013.01); *B66D 1/36* (2013.01); *F21S 8/061* (2013.01); *F21V 21/38* (2013.01);
(Continued)

(58) Field of Classification Search
CPC ... F16M 13/027; F16M 2200/028; F21S 8/04; F21S 8/061; H04N 5/2253; H04N 7/18;
(Continued)

(56) References Cited

U.S. PATENT DOCUMENTS 7,033,048 B2    4/2006    Sin
7,448,474 B2    11/2008    Aulanko et al.
(Continued)

FOREIGN PATENT DOCUMENTS

CN    1279308 C    10/2006
CN    103206656 A    7/2013
(Continued)

*Primary Examiner* — Sang K Kim
*Assistant Examiner* — Nathaniel L Adams
(74) *Attorney, Agent, or Firm* — Womble Bond Dickinson (US) LLP; John J. Penny, Jr.

(57) ABSTRACT

Disclosed is a lifting apparatus for highly mounted equipment, which includes a main body installed at a predetermined height and having a hollow drum around which a wire rope is wound and a driving motor installed to give a rotation force to the drum; a moving body suspended from the wire rope and having an equipment coupling unit provided at a lower end thereof; a coupling unit located at a lower portion of the main body and having an accommodation structure with an open lower portion to be coupled to the moving body and a stopper installed at the accommodation structure to fix a coupled state of the moving body; and an upper contact portion and a lower contact portion respectively installed at the main body and the moving body to contact each other when the moving body ascends and is coupled to the main body by winding the wire rope, wherein the drum is disposed to lie down in the main body, wherein the wire rope unwound from the drum passes through the hollow of the drum and is connected to the moving body, and wherein when the main body is coupled to the moving body, the upper contact portion and the lower contact portion contact each other in the hollow of the drum.

12 Claims, 9 Drawing Sheets

(51) Int. Cl.
*B66D 1/36* (2006.01)
*F21S 8/06* (2006.01)
*H04N 5/225* (2006.01)
*H04N 7/18* (2006.01)
*F21S 8/04* (2006.01)
*F21V 23/06* (2006.01)

(52) U.S. Cl.
CPC ........... *H04N 5/2253* (2013.01); *H04N 7/183* (2013.01); *F16M 2200/028* (2013.01); *F21S 8/04* (2013.01); *F21V 23/06* (2013.01); *H04N 7/18* (2013.01)

(58) Field of Classification Search
CPC .......... H04N 7/183; F21V 21/38; B66D 1/34; B66D 1/36; B66D 1/60; B66D 3/26
See application file for complete search history.

(56) References Cited

U.S. PATENT DOCUMENTS 8,215,618 B2   7/2012   Kochan et al.
2004/0012969 A1   1/2004   Sin
2010/0051767 A1   3/2010   Erel et al.

FOREIGN PATENT DOCUMENTS

| | | |
|---|---|---|
| EP | 3034937 A1 | 6/2016 |
| GB | 243828 A | 12/1925 |
| JP | 11-203932 A | 7/1999 |
| JP | 2004-518245 A | 6/2004 |
| JP | 2007-012602 A | 1/2007 |
| JP | 3167942 U | 5/2011 |
| JP | 4746509 B2 | 8/2011 |
| JP | 4819578 B2 | 11/2011 |
| KR | 10-2005-0004875 A | 1/2005 |
| KR | 10-0679998 B1 | 2/2007 |
| KR | 10-2008-0076066 A | 8/2008 |
| KR | 10-0908039 B1 | 7/2009 |
| KR | 10-1056847 B1 | 8/2011 |
| KR | 10-1133858 B1 | 4/2012 |
| KR | 10-1193373 B1 | 10/2012 |
| KR | 10-2014-0147224 A | 12/2014 |
| KR | 10-1589715 B1 | 1/2016 |
| RU | 2032850 C1 | 4/1995 |
| SU | 1737224 A1 | 5/1992 |
| WO | 2007-133032 A1 | 11/2007 |
| WO | 2014/204244 A1 | 12/2014 |

LIFTING APPARATUS FOR HIGHLY MOUNTED EQUIPMENT

TECHNICAL FIELD

The present application claims priority to Korean Patent Application No. 10-2015-0096132 filed on Jul. 6, 2015 and Korean Patent Application No. 10-2016-0036094 filed on Mar. 25, 2016 in the Republic of Korea, the disclosures of which are incorporated herein by reference.

The present disclosure relates to a lifting apparatus for highly mounted equipment, and more particularly, to a lifting apparatus for highly mounted equipment, which is configured to lift the highly mounted equipment by winding or unwinding a wire rope to/from a drum.

BACKGROUND ART

Generally, a so-called highly-mounted lamp is installed at a ceiling of a hotel lobby, a factory or a gym and a streetlight on a road. A sodium bulb or a mercury bulb is generally installed at the highly-mounted lamp, and the highly-mounted lamp should be periodically exchanged due to a limited life span of 5000 to 6000 hours. In addition, a highly-mounted lamp installed at a service place such as a hotel lobby or a wedding hall should be periodically cleaned and exchanged to maintain its appearance and demonstration effect.

In case of a streetlight, the highly-mounted lamp is located at a high location with a height of 7 to 10 m, and thus in order to clean or exchange the highly-mounted lamp, a crane or ladder truck is used for the work at a high location. In addition, in a wedding hall or a hotel lobby with a relatively small height, a ladder is used for clean and exchange a bulb of the highly-mounted lamp, which however has a risk of an accident. Further, for the cleaning or exchanging work, at least three workers should be required a team. Moreover, since a crane or a ladder truck, which is a large working facility, is required for cleaning or exchanging the highly-mounted lamp, the work takes a long time and occupies a large working. Therefore, when repairing or exchanging the highly-mounted lamp, it is required for stopping a production line of a factory or a gym for a long time, and thus the repairing or exchanging work should be finished rapidly. In particular, when for the maintenance of a streetlight, a cargo crane occupies one lane, which may cause traffic congestion or the like.

As an alternative, a working method and device for moving down the highly-mounted lamp to the ground where a worker is located and then moving up the highly-mounted lamp to the ceiling after repair, which does not need the worker to move up to the highly-mounted lamp, has been constantly developed.

As a device for moving down the highly-mounted lamp to the ground, there have been proposed a manual lifting apparatus for a highly-mounted lamp, which fixes a wire rope to the lamp, and winds the wire rope around a pulley fixed at the ground via the ceiling so that the highly-mounted lamp is moved up by manipulating a handle bar connected to the pulley, and an automatic lifting apparatus for a highly-mounted lamp, which uses a driving motor instead of the handle bar.

Generally, the automatic lifting apparatus for a highly-mounted lamp includes a socket (a main body) fixed at a predetermined height on the ceiling, a light inserted into the socket and connected thereto with a contact point and having a bulb mounted to a lower side thereof, a wire rope having one side fixed to an upper side of the light and the other side wound on a drum installed at a predetermined location of the socket as much as a predetermined length, and a driving motor for automatically winding or unwinding the wire rope on the drum according to the selection of a user to life the light.

The function for winding or unwinding the wire rope, provided at the automatic lifting apparatus for a highly-mounted lamp, is for example disclosed in Korean Patent Registration No. 10-1056847. Korean Patent Registration No. 10-1056847 discloses a lifting apparatus for a highly-mounted lamp, which includes a sensing board expelled in an outer direction of the drum as the number of layers of the wire rope wound on the drum increases, and a driving switch pressed by the contact of the sensing board when the sensing board is expelled to a set location, to stop operation of a driving means which rotates the drum, wherein the drum is disposed to be erect in the main body. Here, the state where "the drum is disposed to stand erect in the main body" means that the axis of rotation of the drum, namely an axial direction of the drum, is horizontal with respect to the ground.

However, if the drum is placed to stand erect in the main body as disclosed in Korean Patent Registration No. 10-1056847, a diameter direction of the drum is identical to a height (thickness) direction of the main body. Thus, if the drum is designed to have a large size, the height (thickness) of the main body also increases, which results in uneasy handling and installation.

In addition, since the existing automatic lifting apparatus for a highly-mounted lamp has bad space utilization due to the drum provided erect in the main body, it is not easy to ensure an installation space of a contact point for electric connection between the light and the socket fixed at the ceiling.

Meanwhile, if the highly mounted equipment is a CCTV camera, a CCTV camera lifting apparatus includes a moving body having a lower end coupled to a camera, a wire rope from which the moving body hangs, and a drum and a driving motor for taking up the wire rope. A technique in relation to the CCTV camera lifting apparatus is disclosed in Korean Patent Registration No. 10-1193373.

Since the CCTV camera is installed at a high location, it is important that the main body of the CCTV camera lifting apparatus is designed as compact as possible.

When a lifting CCTV camera is completely installed, the moving body is hooked by a predetermined stopper located at a lower end thereof to keep its fixed state. However, in this structure, in a state where the moving body is supported by the stopper, a predetermined clearance is present above the moving body, and thus the moving body may be easily shaken due to an external force such as wind, vibrations or the like. Here, the clearance is a space in which a hooking unit at a top of the moving body passes over the stopper and then moves further by a predetermined distance to be hooked to the stopper.

If the moving body is shaken due to wind or the like, the camera is also shaken, which may deteriorate the function of the CCTV camera. Also, if a strong wind is applied, the camera may fall down.

Meanwhile, if the moving body is continuously supported by the stopper as described above, a load of the moving body and the camera is applied to the stopper, which may deform or damage the stopper. If the stopper malfunctions or operates incorrectly, the hooked moving body is released so that the moving body falls down. Thus, a strong tensile force is instantly applied to the wire rope, which has been loosely connected to an upper portion thereof, which may make the wire rope be cut and thus cause a damage of the CCTV camera and an accident.

DISCLOSURE

Technical Problem

The present disclosure is designed to solve the problems of the related art, and therefore the present disclosure is directed to providing a lifting apparatus for highly mounted equipment, which may have an improved drum arrangement so that a main body accommodating the drum may be designed compact, and allow the main body to be electrically connected to a moving body by means of a contact point by utilizing the drum arrangement.

The present disclosure is also directed to providing a lifting apparatus for highly mounted equipment, which may prevent a camera and a moving body from being shaken due to an external force such as wind after a CCTV camera is completely installed.

The present disclosure is also directed to providing a lifting apparatus for highly mounted equipment, which may prevent a load of the camera and the moving body from being applied to a stopper after the CCTV camera is completely installed.

Technical Solution

In one aspect of the present disclosure, there is provided a lifting apparatus for highly mounted equipment, comprising: a main body installed at a predetermined height and having a hollow drum around which a wire rope is wound and a driving motor installed to give a rotation force to the drum; a moving body suspended from the wire rope and having an equipment coupling unit provided at a lower end thereof; a coupling unit located at a lower portion of the main body and having an accommodation structure with an open lower portion to be coupled to the moving body and a stopper installed at the accommodation structure to fix a coupled state of the moving body; and an upper contact portion and a lower contact portion respectively installed at the main body and the moving body to contact each other when the moving body ascends and is coupled to the main body by winding the wire rope, wherein the drum is disposed to lie down in the main body, wherein the wire rope unwound from the drum passes through the hollow of the drum and is connected to the moving body, and wherein when the main body is coupled to the moving body, the upper contact portion and the lower contact portion contact each other in the hollow of the drum.

The accommodation structure may be located in the hollow of the drum.

Preferably, the upper contact portion may be fixed to an upper portion of the accommodation structure, and the lower contact portion may be fixed to an upper portion of the moving body, which is inserted into the accommodation structure.

Through holes may be respectively formed in the upper contact portion and the lower contact portion so that the wire rope passes through the through holes.

The drum may be disposed to have an axial direction perpendicular to the ground.

The lifting apparatus for highly mounted equipment according to the present disclosure may further include an anti-friction roll interposed between the accommodation structure and the drum to be contactable with an inner circumference of the drum.

The lifting apparatus for highly mounted equipment according to the present disclosure may further include a guide groove formed at a lower surface of the main body to surround the accommodation structure circularly and coupled to a part of the moving body.

The lifting apparatus for highly mounted equipment according to the present disclosure may further include a guide frame disposed in the main body to traverse an upper portion of the drum, and a plurality of guide rolls installed at the guide frame to guide the wire rope unwound from a side of the drum into the hollow of the drum via an upper portion of the drum.

A fixing unit may be mounted to the guide frame to support an end portion of the wire rope, and the wire rope may extend in a zigzag pattern by means of the guide rolls, the moving body and the fixing unit to pass through the hollow of the drum at least twice.

The fixing unit may have a trust bearing for preventing the wire rope from being twisted.

At least one of a lamp, a fire detector and a CCTV camera may be coupled to the equipment coupling unit.

In another aspect of the present disclosure, there is also provided a lifting apparatus for highly mounted equipment, comprising: a main body installed at a predetermined height and having a hollow drum around which a wire rope is wound and a driving motor installed to give a rotation force to the drum; a moving body suspended from the wire rope and having a CCTV camera provided at a lower end thereof; a coupling unit located in the hollow of the drum and having an accommodation structure with an open lower portion to be coupled to the moving body and a stopper installed at the accommodation structure to give a fall prevention function to the moving body; and an upper contact portion and a lower contact portion respectively installed at the main body and the moving body to contact each other when the moving body ascends and is coupled to the main body by winding the wire rope, wherein the drum is disposed to lie down in the main body, wherein the wire rope unwound from the drum passes through the hollow of the drum and is connected to the moving body, wherein when the main body is coupled to the moving body, the upper contact portion and the lower contact portion contact each other in the hollow of the drum, wherein in a state where the main body and the moving body are completely coupled so that the upper contact portion and the lower contact portion contact each other, a hooking unit of the moving body is disposed spaced apart from the stopper in an upper direction with a clearance so that the wire rope connected to the moving body keeps tight, wherein in a state where the main body and the moving body are completely coupled, the moving body is hooked to a hooking structure located at an upper portion of the accommodation structure and tightly pulled by the wire rope in a close contact state, and wherein the stopper moves back when the moving body is passing, and when the moving body ascends completely, the stopper stands by in a state of protruding from an inner wall of the accommodation structure.

Advantageous Effects

The lifting apparatus for highly mounted equipment according to the present disclosure gives the following effects.

First, since a drum is disposed to have an axial direction perpendicular to the ground in the main body of the lifting apparatus, the main body may have a compact design, and thus the lifting apparatus may be easily handled and installed.

Second, since an upper contact portion and a lower contact portion contact each other by using an inner space of the drum, the space utilization may be enhanced.

Third, since the upper contact portion and the lower contact portion are coupled in a state where the moving body is accurately united to an accommodation structure located in a hollow of the drum, the contact reliability of the contact portions may be enhanced.

Fourth, since two or more wire ropes may be provided through the hollow of the drum to support the moving body, highly mounted equipment having a great load may also be stably supported.

Fifth, since the moving body is supported in a close contact with the main body by means of a high-strength wire rope when a CCTV camera is completely installed, it is possible to prevent the moving body from being shaken and thus reduce a risk of falling.

Sixth, since a stopper is disposed below the moving body with a distance, it is possible to give a fall prevention function.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Figure 1:
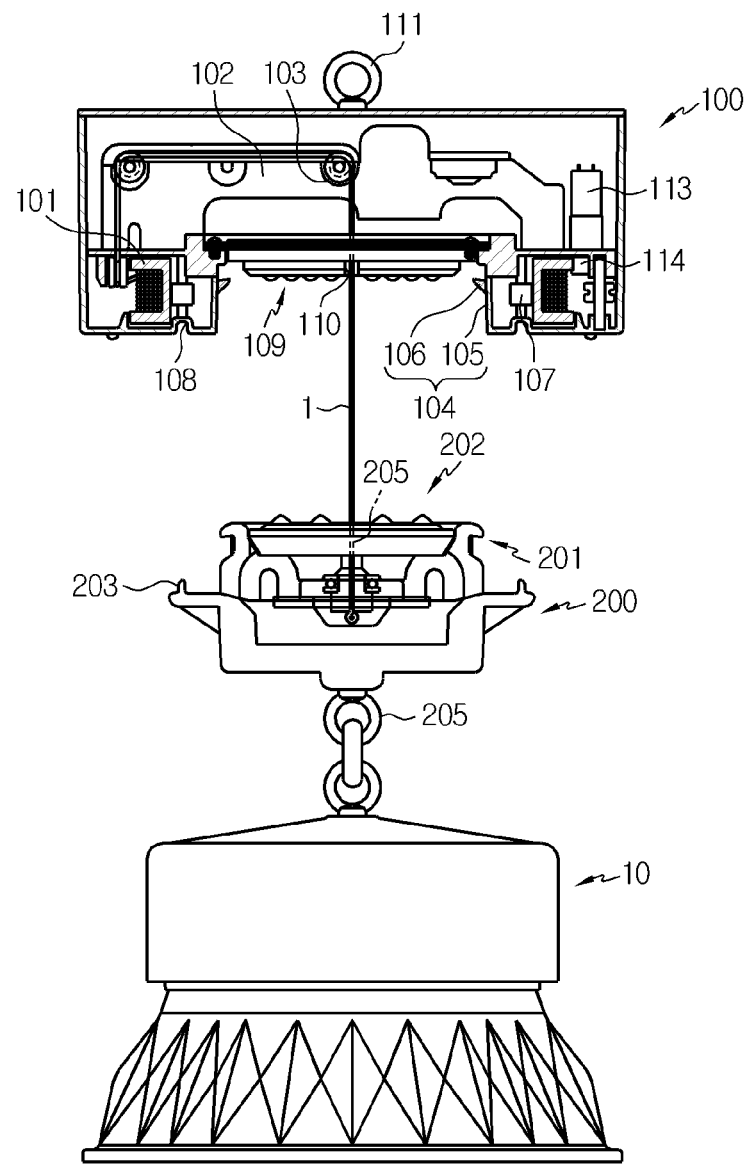
FIG. 1 is a side view showing a lifting apparatus for highly mounted equipment according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, each component or a specific portion of each component is depicted in an exaggerated, excluded or simplified state for the convenience of understanding and clarity. Therefore, the size of each component may not fully reflect an actual size. Also, any explanation of the prior art known to relate to the present invention may be omitted if it is regarded to render the subject matter of the present invention vague.

Also, even though the terms indicating up, down, left, right, front and rear directions and front and side surfaces are used in the specification, it is obvious to those skilled in the art that these merely represent relative locations for convenience in explanation and may vary based on a location of an observer or a shape in which an object is placed.

Figure 2:
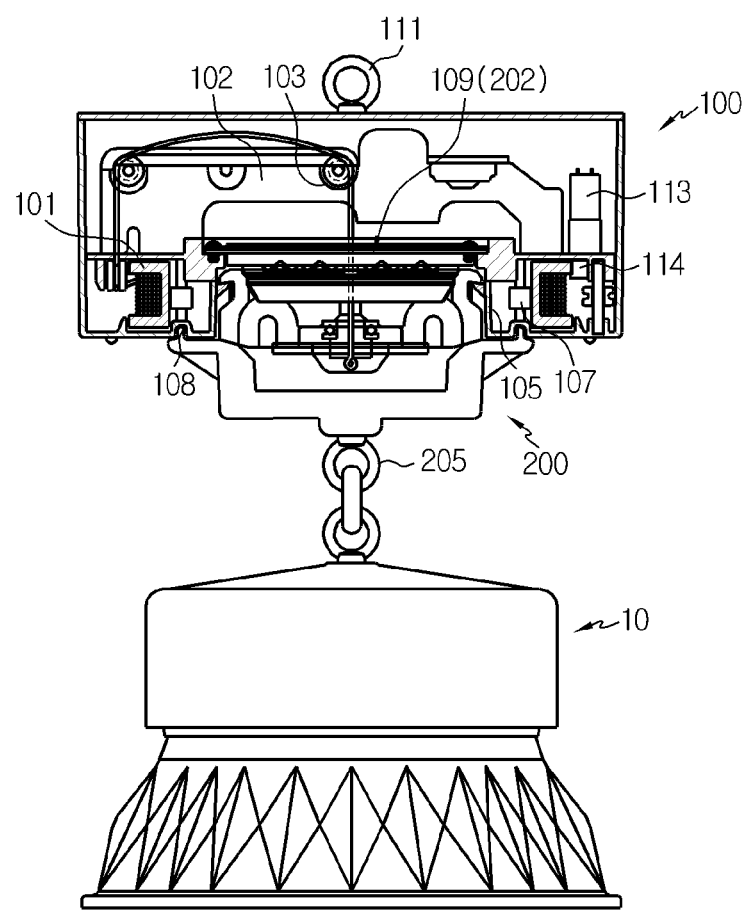
FIG. 2 is a side view showing that a moving body ascends in FIG. 1.

FIG. 1 is a side view showing a lifting apparatus for highly mounted equipment according to an embodiment of the present disclosure, and FIG. 2 is a side view showing that a moving body ascends and coupled to a main body in FIG. 1.

Referring to FIGS. 1 and 2, a lifting apparatus for highly mounted equipment according to an embodiment of the present disclosure includes a main body 100 installed at a predetermined height and having a drum 101 installed therein to have an axial direction perpendicular to the ground, a coupling unit 104 located at a lower portion of the main body 100, a moving body 200 suspended at a wire rope 1 wound around the drum 101 and having an equipment coupling unit 205 provided at a lower end thereof so that highly mounted equipment 10 is mountable thereto, and an upper contact portion 109 and a lower contact portion 202 contacting each other when the moving body 200 ascends and is coupled to the main body 100 by means of the coupling unit 104.

The main body 100 is installed at a predetermined high location of a structure such as a building ceiling or a streetlight. In order to install the main body 100, a mounting member 111 composed of, for example, a ring bolt is provided at a top of the main body 100. As an alternative, a predetermined support bracket (not shown) capable of being coupled to a predetermined H beam provided at a building ceiling may also be connected to the main body 100.

In the main body 100, a drum 101 around which the wire rope 1 may be wound and a driving motor 113 for giving a clockwise and counterclockwise rotation force to the drum 101 are provided. The driving motor 113 may employ a geared motor.

The drum 101 is a cylindrical hollow bobbin on which the wire rope 1 may be wound or unwound, and the drum 101 is rotatably installed in the main body 100 in a lying-down state so that its hollow is opened substantially vertically on the basis of the ground. Preferably, the drum 101 is disposed to have an axial direction substantially perpendicular to the ground so as to be parallel to a height direction of the main body 100. In a modification of the present disclosure, the drum 101 may also be provided to be slightly inclined so that its one side is slightly lifted up from a horizontal state where the axial direction of the drum 101 is accurately perpendicular to the ground.

The rotation force provided from the driving motor 113 installed at one side of the main body 100 is transmitted to the drum 101 through a power transmission unit made of a gear assembly. In detail, a ring gear (not shown) is provided along a periphery of a body of the drum 101. The ring gear is engaged with a predetermined driving pinion rotating by the driving motor 113 to receive the rotation force. The ring gear is fixed to the drum 101 or integrated with the drum 101 so that the drum 101 rotates integrally with the ring gear. The power transmission unit may adopt a common technique. The technical configuration for transmitting the rotation force of the driving motor 113 to the drum 101 by using a gear assembly is disclosed in Korean Patent Application No. 10-2013-0070072, filed by the applicant of this application, in detail.

In order to couple the main body 100 to the moving body 200, a coupling unit 104 having a cylindrical accommodation structure 105 is provided at a lower portion of the main body 100.

The coupling unit 104 is located at a lower portion of the main body 100 and, when the moving body 200 ascends to a predetermined point by winding the wire rope 1, the coupling unit 104 allows the main body 100 to be coupled at an accurate location. In detail, the coupling unit 104 includes an accommodation structure 105 shaped to align the moving body 200 to a lower portion of the center of the main body 100, and a stopper 106 for fixing the moving body 200 in a state of being coupled to the main body 100.

The accommodation structure 105 has an open lower portion and has a cylinder shape with an inner space at which at least an upper portion of the moving body 200 may move in and out. The accommodation structure 105 may be formed integrally with the main body 100. As an alternative, the accommodation structure 105 may be provided separately from the main body 100 and detachably coupled to the lower portion of the main body 100.

The accommodation structure 105 is located in the hollow of the drum 101 disposed in the main body 100. In other words, the drum 101 is disposed to substantially surround the accommodation structure 105. In this configuration, the hollow of the drum 101 may be utilized as a space for coupling the main body 100 and the moving body 200.

In the space between the accommodation structure 105 and the drum 101, an anti-friction roll 107 is rotatably installed to contact the inner circumference of the drum 101, thereby guiding the drum 101 to rotate in a state where the axial direction of the drum 101 is perpendicular to the ground.

In order to enhance the coupling accuracy between the main body 100 and the moving body 200, a guide groove 108 is formed at the lower surface of the main body 100 to circularly surround the accommodation structure 105. The guide groove 108 is coupled to a guide protrusion 203 provided at the moving body 200 when the moving body 200 is inserted into the accommodation structure 105, thereby guiding the main body 100 and the moving body 200 to be coupled at a proper location.

The stopper 106 is installed to protrude on the inner wall of the accommodation structure 105 and fixes a location of the moving body 200 inserted into the accommodation structure 105. A plurality of stoppers 106 is installed at regular intervals in a circumferential direction on the basis of the accommodation structure 105.

The stopper 106 has a wedge-shaped body having an inclined lower surface and is installed to always maintain a horizontal state when an external force is not applied thereto. The stopper 106 is installed to be pivotable on the basis of a shaft coupled to a part of its body so that the stopper 106 may be pushed and bent upwards when the moving body 200 ascends. A predetermined spring (not shown) is coupled to the stopper 106 to elastically bias and recover its horizontal state. In the present disclosure, the stopper 106 may also be configured to selectively protrude on the inner wall of the accommodation structure 105 by means of a driving means, for example a solenoid.

The moving body 200 is installed to be suspended from the wire rope 1 and moves up and down when the wire rope 1 is wound or unwound. The equipment coupling unit 205 composed of, for example, a ring bolt is provided at a bottom of the moving body 200. The equipment coupling unit 205 may have any shape or structure capable of supporting the highly mounted equipment 10. For example, the equipment coupling unit 205 may have a screw structure which may be screwed with the highly mounted equipment 10.

Figure 3:
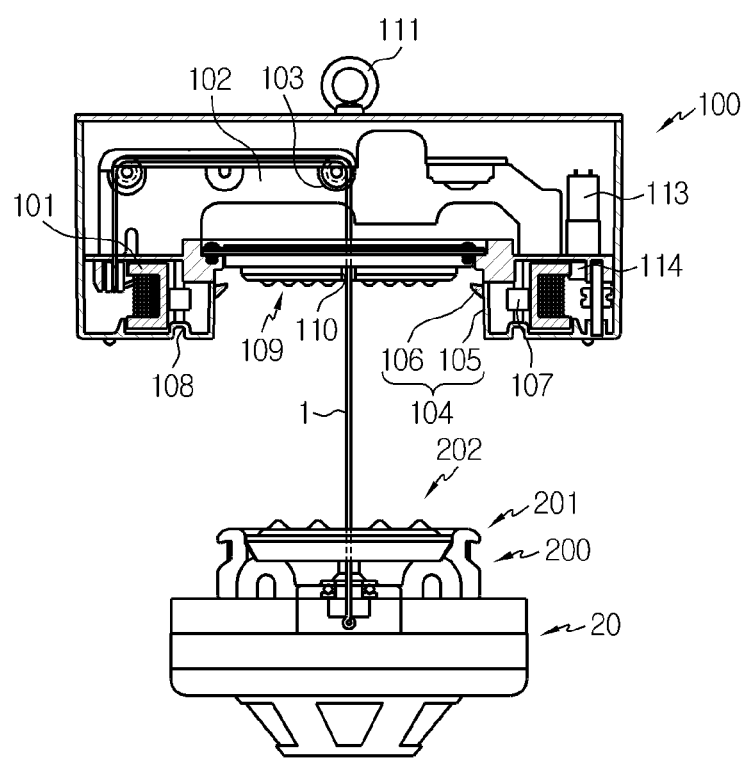
FIG. 3 is a side view showing an example where a fire detector is mounted to an equipment coupling unit in FIG. 1.
Figure 4:
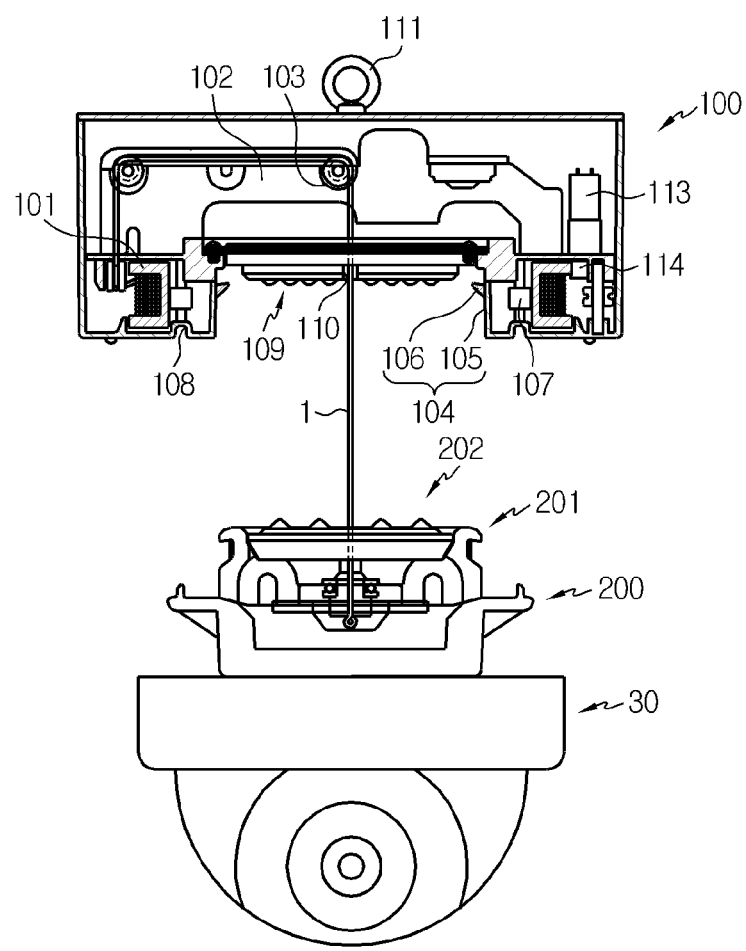
FIG. 4 is a side view showing an example where a CCTV camera is mounted to an equipment coupling unit in FIG. 1.

The highly mounted equipment 10, which corresponds to a lamp, is coupled to the equipment coupling unit 205. In another example, as shown in FIG. 3, highly mounted equipment 20, which corresponds to a fire detector, may be coupled to the equipment coupling unit 205. As still another example, as shown in FIG. 4, highly mounted equipment 30, corresponding to a CCTV camera, may be coupled to the equipment coupling unit 205.

A hooking unit 201 corresponding to the stopper 106 is formed at a top of the outer circumference of the moving body 200. When the moving body 200 ascends, the hooking unit 201 pushes the stopper 106 to pivot upwards, and also its groove is coupled to the stopper 106 to fix a location of the moving body 200.

The wire rope 1 unwound from the drum 101 passes through the hollow of the drum 101 and extends downwards to be connected to the moving body 200. For this, a plurality of guide rolls 103 is disposed beside and above the drum 101 to guide the wire rope 1 unwound from the drum 101 into the hollow of the drum 101. Among the plurality of guide rolls 103, a guide roll 103 located above the drum 101 is mounted to a guide frame 102 which is disposed to traverse the upper portion of the drum 101 in the main body 100.

If the wire rope 1 is a one-wire type, namely if the wire rope 1 passes through the hollow of the drum 101 just once, among the plurality of guide rolls 103, at least one guide roll 103 is disposed at a point where the wire rope 1 may be guided to the center of the hollow of the drum 101.

Figure 5:
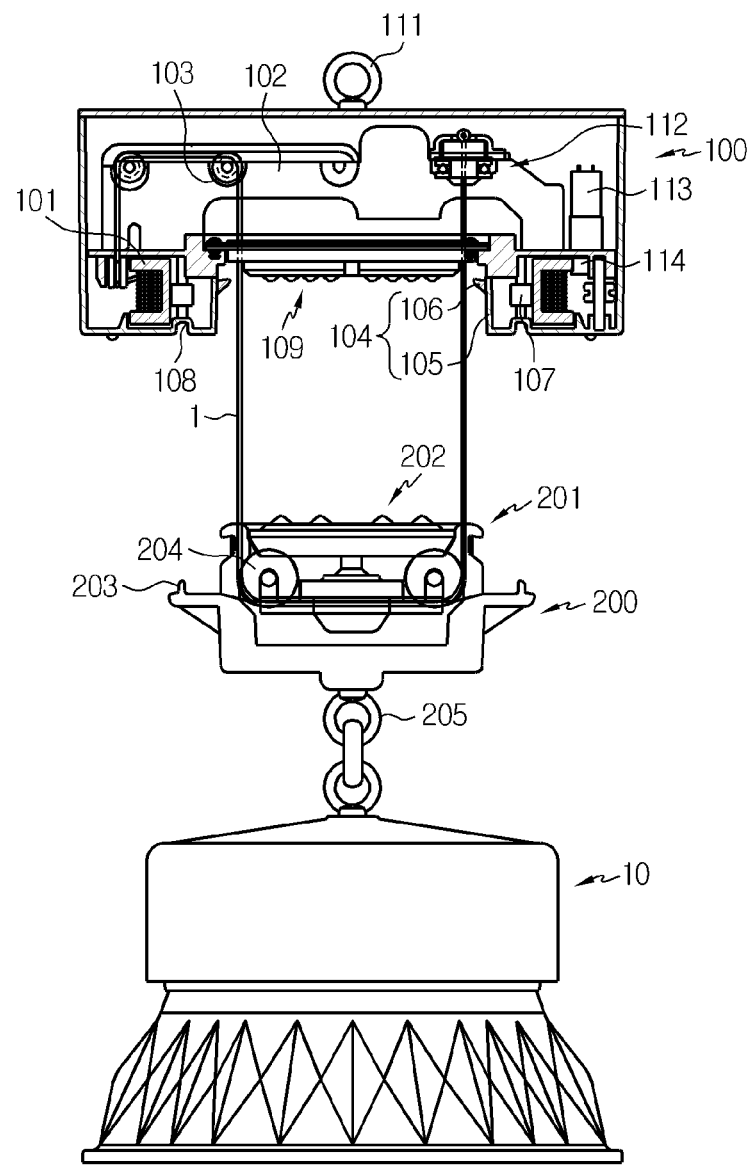
FIG. 5 is a side view showing a lifting apparatus for highly mounted equipment according to another embodiment of the present disclosure.

Meanwhile, if the wire rope 1 is at least a two-wire type, namely if the wire rope 1 passes through the hollow of the drum 101 at least twice, as shown in FIG. 5, the wire rope 1 passes through two locations in the hollow of the drum 101, which are spaced apart on the basis of the center of the hollow. For this, a fixing unit 112 is mounted to the guide frame 102 to support an end portion of the wire rope 1, and the wire rope 1 is arranged so that the end portion is fixed to the fixing unit 112 via the guide roll 103 and the moving body 200. Accordingly, the wire rope 1 includes a first region extending from the guide roll 103 to the moving body 200 and a second region extending from the moving body 200 to the fixing unit 112, and extends in a zigzag pattern as a whole and passes through the hollow of the drum 101 at least twice. In this case, at least one guide roll 204 may be mounted to the moving body 200 so that the moving body 200 may smoothly move with respect to the wire rope 1. In addition, the fixing unit 112 may have a trust bearing in order to prevent the wire rope 1 from being twisted.

Figure 6:
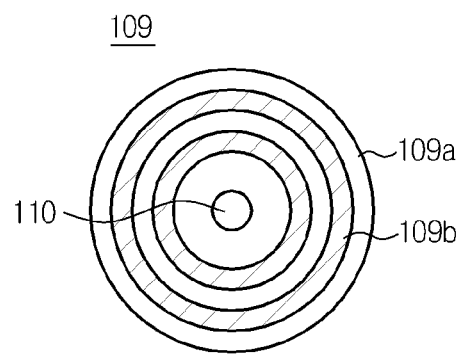
FIG. 6 is a plane view showing an upper contact portion in FIG. 1.

The upper contact portion 109 and the lower contact portion 202 are respectively provided at the lower portion of the main body 100 and the upper portion of the moving body 200 and contact each other to be electrically connected when the main body 100 and the moving body 200 are coupled. In detail, the upper contact portion 109 is fixed to the upper portion of the accommodation structure 105 of the coupling unit 104 disposed at an inner area of the drum 101. As shown in FIG. 6, the upper contact portion 109 may have a plurality of ring-type conductor patterns 109b arranged concentrically at a disk-type base member 109a so that its contact state is maintained even though the moving body 200 just rotates relatively by a predetermined angle with respect to the main body 100 while the moving body 200 is ascending. A through hole 110 is formed in the upper contact portion 109 so that the wire rope 1 may pass through the through hole 110.

The lower contact portion 202 is fixed to the top of the moving body 200, and when the main body 100 and the moving body 200 are coupled, the lower contact portion 202 is inserted into the accommodation structure 105 of the coupling unit 104 to make a contact with the upper contact portion 109. In other words, the upper contact portion 109 and the lower contact portion 202 substantially contact each other at the inner area of the hollow of the drum 101.

Figure 7:
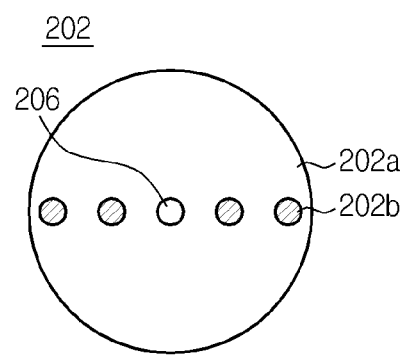
FIG. 7 is a plane view showing a lower contact portion in FIG. 1.

As shown in FIG. 7, the lower contact portion 202 has a plurality of dot-type conductor patterns 202b, which corresponds to the concentric conductor pattern 109b, in a radial direction at the disk-type base member 202a. A through hole 206 is also formed in the lower contact portion 202 so that the wire rope 1 may pass through the through hole 206.

As an alternative, it is also possible that the upper contact portion 109 has a dot-type conductor pattern and the lower contact portion 202 has a ring-type conductor pattern. As another alternative, the upper contact portion 109 and the lower contact portion 202 may have a ring-type conductor pattern and a dot-type conductor pattern in combination.

In the lifting apparatus for highly mounted equipment according to an embodiment of the present disclosure configured as above, when the moving body 200 ascends and is coupled to the main body 100 by winding the wire rope 1, the upper contact portion 109 and the lower contact portion 202 contact each other to supply power to the highly mounted equipment 10,20,30 mounted to the moving body 200.

The wire rope 1 is wound by means of the drum 101 which is disposed in the main body 100 to have an axial direction perpendicular to the ground and rotates in a clockwise direction by means of the driving motor 113. At this time, the wire rope 1 is pulled upwards through the hollow of the drum 101, then changes its direction by means of the guide roll 103 and is wound around the drum 101.

When the moving body 200 ascends and reaches a predetermined point by winding the wire rope 1, this state is sensed by a predetermined limit switch, and according to the sensing signal, the rotation of the drum 101 is stopped and the hooking unit 201 provided at the top of the outer circumference of the moving body 200 hooked by the stopper 106 protruding on the inner wall of the accommodation structure 105 of the coupling unit 104, thereby fixing the moving body 200 to the main body 100.

If the moving body 200 is inserted and fixed into the accommodation structure 105, the upper contact portion 109 and the lower contact portion 202 contact each other to be electrically connected, simultaneously. Here, since the accommodation structure 105 is located at the inner space of the drum 101 disposed to have an axial direction perpendicular to the ground, the upper contact portion 109 and the lower contact portion 202 contact each other substantially in the hollow of the drum 101. Since the hollow of the drum 101 is utilized to combine the main body 100 and the moving body 200 and bring the upper contact portion 109 and the lower contact portion 202 to contact each other, space utilization may be greatly enhanced. In addition, since the upper contact portion 109 and the lower contact portion 202 contact each other in a state where the main body 100 and the moving body 200 are accurately combined in a mechanical way, it is possible to prevent any inferior contact.

When cleaning or exchanging the highly mounted equipment 10,20,30, the stopper 106 hooking the moving body 200 is released and then the drum 101 is rotated in a counterclockwise direction so that the wire rope 1 is unwound through the hollow of the drum 101 to move the moving body 200 down to the ground. In order to release the hooking state of the stopper 106, the drum 101 may slightly rotate in a clockwise direction to slightly move the moving body 200 upwards. By this process, the stopper 106 may depart from the side of the moving body 200 and be restored to its original location, and accordingly the moving body 200 may be shifted to a state where the moving body 200 may freely descend.

As described above, in the lifting apparatus for highly mounted equipment according to the present disclosure, since the drum 101 is disposed in the main body 100 to have an axial direction perpendicular to the ground and operated to wind or unwind the wire rope 1, the main body 100 may have a compact design, and the empty space in the drum 101 may be utilized to bring the upper contact portion 109 and the lower contact portion 202 into point contact, thereby enhancing space utilization.

Figure 8:
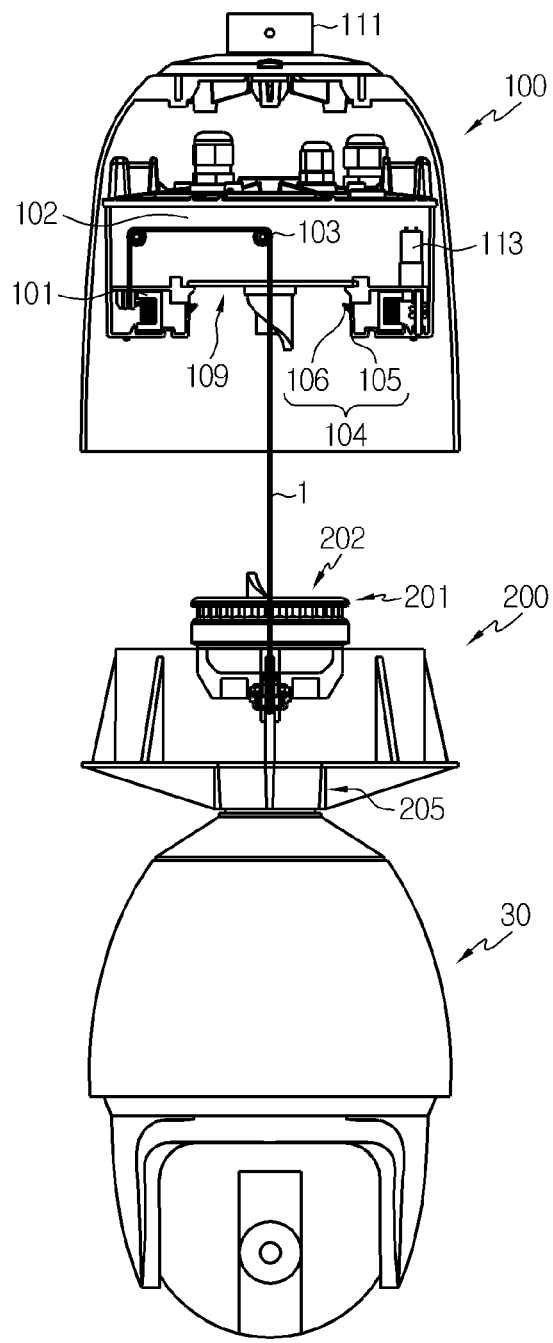
FIG. 8 is a side view showing a lifting apparatus for highly mounted equipment according to another embodiment of the present disclosure.

FIG. 8 is a side view showing a lifting apparatus for highly mounted equipment according to another embodiment of the present disclosure.

Referring to FIG. 8, the lifting apparatus for highly mounted equipment includes a main body 100 installed at a predetermined height and having a drum 101 installed therein to have an axial direction perpendicular to the ground, a coupling unit 104 located at a lower portion of the main body 100 so that a stopper 106 is installed therein, a moving body 200 suspended at a wire rope 1 wound around the drum 101 and having a lower end to which a CCTV camera 30 is provided to serve as highly mounted equipment, a stopper 106 located below a hooking unit 201 of the moving body 200, which completely ascends, to be spaced apart from the hooking unit 201, and an upper contact portion 109 and a lower contact portion 202 contacting each other when the moving body 200 ascends and is coupled to the main body 100.

The main body 100 is installed at a predetermined high location of a structure such as a building ceiling or a streetlight. In order to install the main body 100, a predetermined mounting member 111 may be fixed to a top of the main body 100.

In the main body 100, a drum 101 around which the wire rope 1 may be wound and a driving motor 113 for giving a clockwise and counterclockwise rotation force to the drum 101 are provided. The driving motor 113 may employ a geared motor.

The drum 101 is a cylindrical hollow bobbin on which the wire rope 1 may be wound or unwound, and the drum 101 is rotatably installed in the main body 100 in a lying-down state so that its hollow is opened substantially vertically on the basis of the ground. Preferably, the drum 101 is disposed to have an axial direction perpendicular to the ground so as to be parallel to a height direction of the main body 100. In this configuration, the main body 100 may have a compact design, and thus the lifting apparatus may be easily handled and installed. In a modification of the present disclosure, the drum 101 may also be provided to be slightly inclined so that its one side is slightly lifted up from a horizontal state where the axial direction of the drum 101 is accurately perpendicular to the ground.

The rotation force provided from the driving motor 113 installed at one side of the main body 100 is transmitted to the drum 101 through a predetermined power transmission unit made of a gear assembly. In detail, a ring gear (not shown) is provided along a periphery of a body of the drum 101. The ring gear is engaged with a predetermined driving pinion rotating by the driving motor 113 to receive the rotation force. The ring gear is fixed to the drum 101 or integrated with the drum 101 so that the drum 101 rotates integrally with the ring gear. The power transmission unit may adopt a common technique In order to couple the main body 100 to the moving body 200, a coupling unit 104 having a cylindrical accommodation structure 105 is provided at a lower portion of the main body 100.

The coupling unit 104 is located at a lower portion of the main body 100 and, when the moving body 200 ascends to a predetermined point by winding the wire rope 1, the coupling unit 104 allows the main body 100 to be coupled at an accurate location. In detail, the coupling unit 104 includes an accommodation structure 105 shaped to align the moving body 200 to a lower portion of the center of the main body 100, and a stopper 106 for fixing the moving body 200 in a state of being coupled to the main body 100.

The accommodation structure 105 has an open lower portion and has a cylinder shape with an inner space at which at least an upper portion of the moving body 200 may move in and out. The accommodation structure 105 may be formed integrally with the main body 100. As an alternative, the accommodation structure 105 may be provided separately from the main body 100 and detachably coupled to the lower portion of the main body 100.

The accommodation structure 105 is located in the hollow of the drum 101 disposed in the main body 100. In other words, the drum 101 is disposed to substantially surround the accommodation structure 105. In this configuration, the hollow of the drum 101 may be utilized as a space for coupling the main body 100 and the moving body 200.

Figure 9:
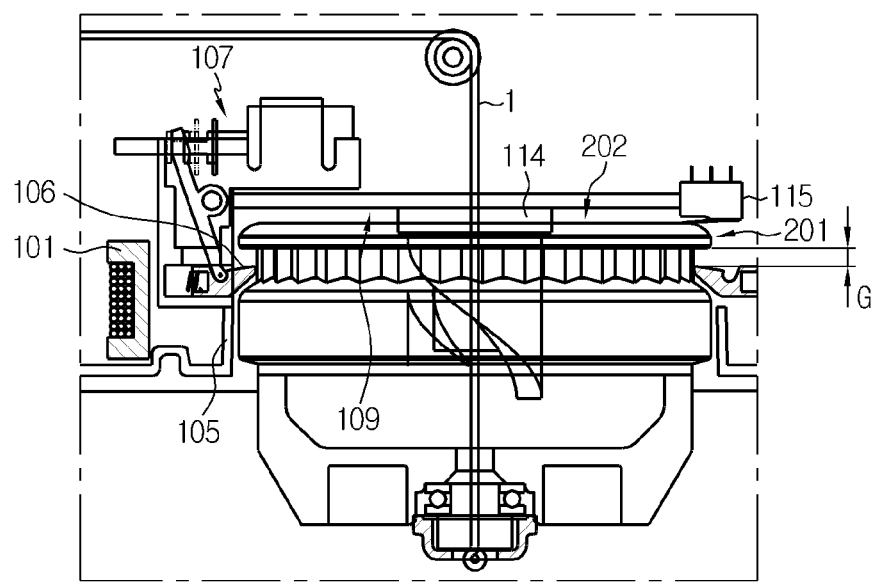
FIG. 9 is a partially enlarged view showing a state where the moving body ascends in FIG. 8.

The stopper 106 is installed to protrude on the inner wall of the accommodation structure 105 to play a role of preventing the moving body 200 inserted into the accommodation structure 105 from falling down. In a state where the main body 100 and the moving body 200 are completely coupled, as shown in FIG. 9, the stopper 106 is disposed spaced apart downwards with a clearance (G) of several millimeters (mm) from the lower end of the hooking unit 201 located at the top of the moving body 200. In other words, the hooking unit 201 located near the top of the moving body 200 is disposed spaced apart upwards with a clearance from the top of the stopper 106. In addition, the drum 101 is unwound by a predetermined length, so that the wire rope 1 connected to the moving body 200 keeps a tight state by applying a tensile force in a longitudinal direction by means of the load of the moving body 200 and the CCTV camera 30.

In a state where the main body 100 and the moving body 200 are completely coupled, the moving body 200 may be pulled tightly by the wire rope 1 to be coupled and closely adhered to a hooking structure 114 having a predetermined shape and located at an upper portion of the accommodation structure 105.

In order to successfully prevent a falling motion of the moving body 200 which is falling down, a plurality of stoppers 106 is installed at regular intervals in a circumferential direction on the basis of the accommodation structure 105.

The stopper 106 is configured to selectively advance by means of a solenoid device 107 to protrude on the inner wall of the accommodation structure 105. As an alternative, the stopper 106 is installed to be pivotable on the basis of a shaft coupled to a part of its body so that the stopper 106 may be pushed and bent upwards when the moving body 200 ascends. The stopper 106 has a wedge-shaped body having an inclined lower surface, and a predetermined spring (not shown) may be coupled to the stopper 106 to elastically bias and recover its horizontal state.

The moving body 200 is connected to be suspended from the wire rope 1 and moves up and down when the wire rope 1 is wound or unwound. An equipment coupling unit 204 having, for example, a screw structure is provided at a bottom of the moving body 200. The equipment coupling unit 204 may have any shape or structure capable of supporting the CCTV camera 30.

The wire rope 1 unwound from the drum 101 passes through the hollow of the drum 101 and extends downwards to be connected to the moving body 200. For this, a plurality of guide rolls 103 is disposed beside and above the drum 101 to guide the wire rope 1 unwound from the drum 101 into the hollow of the drum 101. Among the plurality of guide rolls 103, a guide roll 103 located above the drum 101 is mounted to a guide frame 102 which is disposed to traverse the upper portion of the drum 101 in the main body 100.

If the wire rope 1 is a one-wire type, namely if the wire rope 1 passes through the hollow of the drum 101 just once, among the plurality of guide rolls 103, at least one guide roll 103 is disposed at a point where the wire rope 1 may be guided to the center of the hollow of the drum 101. This structure where the wire rope 1 is a one-wire type is useful for an environment in which the CCTV camera 30 has a light weight and is installed very high.

Figure 10:
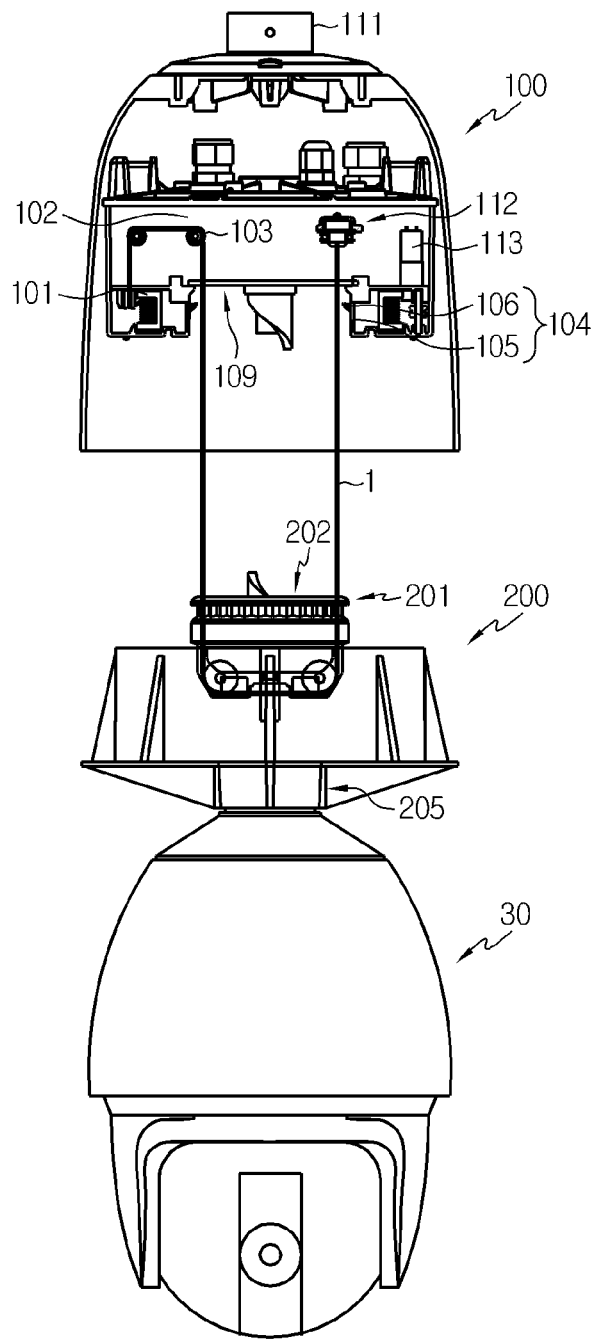
FIG. 10 is a side view showing a modification of FIG. 8.

Meanwhile, if the wire rope 1 is at least a two-wire type, namely if the wire rope 1 passes through the hollow of the drum 101 at least twice, as shown in FIG. 10, the wire rope 1 passes through two locations in the hollow of the drum 101, which are spaced apart on the basis of the center of the hollow. For this, the wire rope 1 is arranged so that its end portion is fixed to the guide frame 102 through a fixing unit 112 via the guide roll 103 and the moving body 200. Accordingly, the wire rope 1 includes a first region extending from the guide roll 102 to the moving body 200 and a second region extending from the moving body 200 to the fixing unit 112, and extends in a zigzag pattern as a whole and passes through the hollow of the drum 101 at least twice. Here, the fixing unit 112 connected to the end portion of the wire rope 1 fixed to the guide frame 102 may have a trust bearing in order to prevent the wire rope 1 from being twisted.

The upper contact portion 109 and the lower contact portion 202 are respectively provided at the lower portion of the main body 100 and the upper portion of the moving body 200 and contact each other to be electrically connected when the main body 100 and the moving body 200 are coupled. In detail, the upper contact portion 109 is fixed to the upper portion of the accommodation structure 105 of the coupling unit 104 disposed at an inner area of the drum 101. The upper contact portion 109 may have a plurality of ring-type conductor patterns arranged concentrically at a disk-type base member so that its contact state is maintained even though the moving body 200 rotates relatively by a predetermined angle with respect to the main body 100 while the moving body 200 is ascending. A predetermined through hole is formed in the upper contact portion 109 so that the wire rope 1 may pass through the through hole.

The lower contact portion 202 is fixed to the top of the moving body 200, and when the main body 100 and the moving body 200 are coupled, the lower contact portion 202 is inserted into the accommodation structure 105 of the coupling unit 104 to make a contact with the upper contact portion 109. In other words, the upper contact portion 109 and the lower contact portion 202 substantially contact each other at the inner area of the hollow of the drum 101.

The lower contact portion 202 has a plurality of dot-type conductor patterns, which corresponds to the concentric conductor pattern, in a radial direction at the disk-type base member. A predetermined through hole is also formed in the lower contact portion 202 so that the wire rope 1 may pass through the through hole.

As an alternative, it is also possible that the upper contact portion 109 has a dot-type conductor pattern and the lower contact portion 202 has a ring-type conductor pattern. As another alternative, the upper contact portion 109 and the lower contact portion 202 may have a ring-type conductor pattern and a dot-type conductor pattern in combination.

In the lifting CCTV camera system according to an embodiment of the present disclosure configured as above, when the moving body 200 ascends and is coupled to the main body 100 by winding the wire rope 1, the upper contact portion 109 and the lower contact portion 202 contact each other to supply power to the CCTV camera 30 mounted to the moving body 200.

The wire rope 1 is wound by means of the drum 101 which is disposed in the main body 100 to have an axial direction perpendicular to the ground and rotates in a clockwise direction by means of the driving motor 113. At this time, the wire rope 1 is pulled upwards through the hollow of the drum 101, then changes its direction by means of the guide roll 103 and is wound around the drum 101.

When the moving body 200 ascends by winding the wire rope 1 so that the hooking unit 201 provided at the top of the outer circumference thereof is inserted into the accommodation structure 105 to pass over the stopper 106 and reaches a predetermined upper limit, this state is sensed by a limit switch 115, and according to the sensing signal, the rotation of the drum 101 is stopped. At this time, the top of the moving body 200 is hooked by the hooking structure 114 in the main body 100 to keep closely adhered thereto.

When the moving body 200 is completely coupled to the main body, the moving body 200 and the hooking unit 201 keeps spaced apart with a clearance (G) with respect to the stopper 106 protruding on the inner wall of the accommodation structure 105 of the coupling unit 104. At this time, the wire rope 1 connected to the moving body 200 keeps tightly pulled by the load of the moving body 200 and the CCTV camera 30.

Since the moving body 200 keeps tightly pulled by the wire rope 1 in a state where its top is closely adhered to the hooking structure 114, it is possible to prevent the moving body 200 from being shaken due to wind or the like.

The stopper 106 moves back when the moving body 200 is passing, and when the moving body 200 ascends completely, the stopper 106 stands by in a state of protruding from the inner wall of the accommodation structure 105. If the wire rope 1 is cut due to aging or external force, the moving body 200 falls down as much as a predetermined clearance (G) and then is hooked to and supported by the stopper 106, thereby preventing the moving body 200 from falling to the ground. At this time, since the moving body 200 falls by a very short distance corresponding to the clearance (G) of several millimeters (mm), a very weak impact is applied to the stopper 106.

When the moving body 200 and the main body 100 are coupled, the moving body 200 is inserted into and fixed to the accommodation structure 105, and simultaneously the upper contact portion 109 and the lower contact portion 202 contact each other to be electrically connected. Here, since the accommodation structure 105 is located at the inner space of the drum 101 disposed to have an axial direction perpendicular to the ground, the upper contact portion 109 and the lower contact portion 202 substantially contact in the hollow of the drum 101. Since the hollow of the drum 101 is utilized to combine the main body 100 and the moving body 200 and bring the upper contact portion 109 and the lower contact portion 202 to contact each other, space utilization may be greatly enhanced. In addition, since the upper contact portion 109 and the lower contact portion 202 contact each other in a state where the main body 100 and the moving body 200 are accurately combined in a mechanical way, it is possible to prevent any inferior contact.

When regularly checking, repairing or cleaning the CCTV camera 30, the stopper 106 hooking the moving body 200 is released and then the drum 101 is rotated in a counterclockwise direction so that the wire rope 1 is unwound through the hollow of the drum 101 to move the moving body 200 down to the ground.

As described above, in the lifting apparatus for highly mounted equipment according to the present disclosure, when the camera is installed completely, the moving body 200 is tightly pulled by means of the high-strength wire rope 1 and keeps closely adhered to the hooking structure 114, and thus it is possible to greatly reduce shaking or falling of the CCTV camera 30.

In addition, since the drum 101 is disposed in the main body 100 to have an axial direction perpendicular to the ground and operated to wind or unwind the wire rope 1, the main body 100 may have a compact design, and the empty space in the drum 101 may be utilized to bring the upper contact portion 109 and the lower contact portion 202 into point contact, thereby enhancing space utilization.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Symbols | |
|---|---|
| 10, 20, 30: highly mounted equipment | 100: main body |
| 101: drum | 102: guide frame |
| 103: guide roll | 104: coupling unit |
| 105: accommodation structure | 106: stopper |
| 107: anti-friction roll | 108: guide groove |
| 109: upper contact portion | 110, 206: through hole |
| 111: mounting member | 112: fixing unit |
| 113: driving motor | 114: hooking structure |
| 200: moving body | 201: hooking unit |
| 202: lower contact portion | 203: guide protrusion |
| 204: guide roll | 205: equipment coupling unit |
| G: clearance | |

What is claimed is:

1. A lifting apparatus for highly mounted equipment, comprising:
   a main body installed at a predetermined height and having a hollow drum around which a wire rope is wound and a driving motor installed to give a rotation force to the drum;
   a moving body suspended from the wire rope and having an equipment coupling unit provided at a lower end thereof;
   a coupling unit located at a lower portion of the main body and having an accommodation structure with an open lower portion to be coupled to the moving body and a stopper installed at the accommodation structure to fix a coupled state of the moving body; and
   an upper contact portion and a lower contact portion respectively installed at the main body and the moving body to contact each other when the moving body ascends and is coupled to the main body by winding the wire rope,
   wherein the drum is disposed to lie down in the main body,
   wherein the wire rope unwound from the drum passes through the hollow of the drum and is connected to the moving body, and
   wherein when the main body is coupled to the moving body, the upper contact portion and the lower contact portion contact each other in the hollow of the drum.

2. The lifting apparatus for highly mounted equipment according to claim 1,
   wherein the accommodation structure is located in the hollow of the drum.

3. The lifting apparatus for highly mounted equipment according to claim 2,
   wherein the upper contact portion is fixed to an upper portion of the accommodation structure, and
   wherein the lower contact portion is fixed to an upper portion of the moving body, which is inserted into the accommodation structure.

4. The lifting apparatus for highly mounted equipment according to claim 3,
   wherein through holes are respectively formed in the upper contact portion and the lower contact portion so that the wire rope passes through the through holes.

5. The lifting apparatus for highly mounted equipment according to claim 1,
   wherein the drum is disposed to have an axial direction perpendicular to the ground.

6. The lifting apparatus for highly mounted equipment according to claim 5, further comprising:
   an anti-friction roll interposed between the accommodation structure and the drum to be contactable with an inner circumference of the drum.

7. The lifting apparatus for highly mounted equipment according to claim 1,
   wherein a guide groove is formed at a lower surface of the main body to surround the accommodation structure circularly and is coupled to a part of the moving body.

8. The lifting apparatus for highly mounted equipment according to claim 1, further comprising:
   a guide frame disposed in the main body to traverse an upper portion of the drum, and
   a plurality of guide rolls installed at the guide frame to guide the wire rope unwound from a side of the drum into the hollow of the drum via an upper portion of the drum.

9. The lifting apparatus for highly mounted equipment according to claim 8,
   wherein a fixing unit is mounted to the guide frame to support an end portion of the wire rope, and
   wherein the wire rope extends in a zigzag pattern by means of the guide rolls, the moving body and the fixing unit to pass through the hollow of the drum at least twice.

10. The lifting apparatus for highly mounted equipment according to claim 9,
    wherein the fixing unit has a trust bearing for preventing the wire rope from being twisted.

11. The lifting apparatus for highly mounted equipment according to claim 1,
    wherein at least one of a lamp, a fire detector and a CCTV camera is coupled to the equipment coupling unit.

12. A lifting apparatus for highly mounted equipment, comprising:
    a main body installed at a predetermined height and having a hollow drum around which a wire rope is wound and a driving motor installed to give a rotation force to the drum;
    a moving body suspended from the wire rope and having a CCTV camera provided at a lower end thereof;
    a coupling unit located in the hollow of the drum and having an accommodation structure with an open lower portion to be coupled to the moving body and a stopper installed at the accommodation structure to give a fall prevention function to the moving body; and
    an upper contact portion and a lower contact portion respectively installed at the main body and the moving body to contact each other when the moving body ascends and is coupled to the main body by winding the wire rope,
    wherein the drum is disposed to lie down in the main body,
    wherein the wire rope unwound from the drum passes through the hollow of the drum and is connected to the moving body,
    wherein when the main body is coupled to the moving body, the upper contact portion and the lower contact portion contact each other in the hollow of the drum,
    wherein in a state where the main body and the moving body are completely coupled so that the upper contact portion and the lower contact portion contact each other, a hooking unit of the moving body is disposed spaced apart from the stopper in an upper direction with a clearance so that the wire rope connected to the moving body keeps tight,
    wherein in a state where the main body and the moving body are completely coupled, the moving body is hooked to a hooking structure located at an upper portion of the accommodation structure and tightly pulled by the wire rope in a close contact state, and
    wherein the stopper moves back when the moving body is passing, and when the moving body ascends completely, the stopper stands by in a state of protruding from an inner wall of the accommodation structure.

* * * * *